(12) United States Patent
Hara et al.

(10) Patent No.: US 9,372,321 B2
(45) Date of Patent: Jun. 21, 2016

(54) OPTICAL ELEMENT, HOLDING STRUCTURE THEREFOR, AND OPTICAL DEVICE

(75) Inventors: Shinichiro Hara, Hachioji (JP); Toshiyuki Majima, Toyokawa (JP); Hiroshi Takagi, Hachioji (JP); Akihiko Matsumoto, Toyokawa (JP)

(73) Assignee: Konica Minolta, Inc., Tokyo (JP)

( * ) Notice: Subject to any disclaimer, the term of this patent is extended or adjusted under 35 U.S.C. 154(b) by 75 days.

(21) Appl. No.: 14/348,860

(22) PCT Filed: Sep. 10, 2012

(86) PCT No.: PCT/JP2012/073085
§ 371 (c)(1),
(2), (4) Date: Mar. 31, 2014

(87) PCT Pub. No.: WO2013/047174
PCT Pub. Date: Apr. 4, 2013

(65) Prior Publication Data
US 2014/0233116 A1 Aug. 21, 2014

(30) Foreign Application Priority Data
Sep. 30, 2011 (JP) .................. 2011-216383

(51) Int. Cl.
*G02B 7/02* (2006.01)
*H04N 1/113* (2006.01)
*B41J 2/47* (2006.01)
*G02B 26/12* (2006.01)
*G11B 7/1372* (2012.01)
*G11B 7/1374* (2012.01)

(52) U.S. Cl.
CPC . *G02B 7/02* (2013.01); *B41J 2/471* (2013.01); *H04N 1/113* (2013.01); *G02B 26/125* (2013.01); *G11B 7/1372* (2013.01); *G11B 7/1374* (2013.01)

(58) Field of Classification Search
CPC .......... G02B 7/003; G02B 7/008; G02B 7/02; G02B 7/022; G02B 7/028; G02B 26/123; G02B 26/125; B41J 2/47; B41J 2/471; H04N 1/113; G03B 21/115; G11B 7/1372; G11B 7/1374
USPC .................. 359/811, 818–820, 205, 206, 664
See application file for complete search history.

(56) References Cited

U.S. PATENT DOCUMENTS 6,487,026 B2 * 11/2002 Baartman ............ G11B 7/1374
359/808
6,791,771 B2 * 9/2004 Kanematsu et al. .......... 359/820

FOREIGN PATENT DOCUMENTS

| JP | 2000-56247 | 2/2000 |
| JP | 2004-54146 | 2/2004 |
| JP | 2006-243438 | 9/2006 |

*Primary Examiner* — Loha Ben
(74) *Attorney, Agent, or Firm* — Cozen O'Connor

(57) ABSTRACT

An optical element has a first surface, a second surface on the opposite side of the first surface, an optical surface, and a protruding part. The protruding part is held in a prescribed position by being in contact with a holding member. The protruding part comprises a first protruding part and a second protruding part. The first protruding part comprises a first contact part that is a convex circular arc shape on at least one longitudinal plane and partly comes into contact with the holding member. The second protruding part comprises a second contact part that is a convex circular arc shape on at least one longitudinal plane and partly comes into contact with the holding member. A circular arc constitutes the first contact part and a circular arc that constitutes the second contact part are present in at least one cross-section that passes through a contact point between the first contact part and the holding member as well as a contact point between the second contact part and the holding member, and the center of the circular arc that constitutes the first contact part is aligned with the center of the circular arc that constitutes the second protruding part.

20 Claims, 13 Drawing Sheets

OPTICAL ELEMENT, HOLDING STRUCTURE THEREFOR, AND OPTICAL DEVICE

RELATED APPLICATIONS

This is a U.S. National Stage of international Application No. PCT/JP2012/073085 filed on Sep. 10, 2012.

This patent application claims the priority of Japanese application no. 2011-216383 filed Sep. 30, 2011, the disclosure content of which is hereby incorporated by reference.

FIELD OF THE INVENTION

The embodiment of the present invention is related to an optical element used in an image-forming device, or the like, and a holding structure therefor, as well as an optical device including these items.

BACKGROUND OF THE INVENTION

Inside an optical device provided in an image-forming device based on an electrophotographic system, such as a copy machine or a laser beam printer, optical elements, such as mirrors, and lenses, are held in prescribed positional relationships with a light-generating device, and other optical components.

One method of holding optical elements at prescribed positions inside an optical device is, for example, a method in which the optical elements are held between a biasing means, such as a board spring and a supporting member.

Patent Document 1 describes a holder for an elastic supporting member [40] that holds a prescribed edge of a mirror [29], the front and back surfaces of which are parallel, and fixes the mirror to a fixed member of an optical device that uses the mirror [29] as a reflecting surface. The elastic supporting member [40] includes a roughly U-shaped elastic member [41] that holds the prescribed edge of the mirror [29] with spring characteristics, and spherical weight parts that are provided on the upper and lower areas of the roughly U-shaped elastic member [41] and face and abut the front and back surfaces of the mirror [29].

In the abovementioned holding structure, depending on the arrangement of the optical elements, there are cases in which an equilibrium cannot be obtained in the force applied to the optical elements and distortion occurs in the optical elements due to the effects of moment. For example, in Patent Document 1, when the optical elements are arranged with a tilt relative to the elastic supporting member [40], a balance between the forces applied to the mirror [29] from the upper and lower weight parts cannot be maintained (refer to FIG. 4(a) in Patent Document 1). In this case, it is possible that distortion may occur in the mirror [29] due to the effects of rotational moment.

PRIOR ART DOCUMENT

Patent Document

[Patent Document 1] Japanese Unexamined Patent Application Publication No. 2006-243438

SUMMARY OF THE INVENTION

Problems to be Solved by the Invention

In recent years, in relation to digital equipment, such as a digital multi-functional machine including functions for copying, printing, fax, scanning, and the like, due to demand for higher resolution and higher definition (for example, increases in resolution from 600 dpi to 1,200 dpi), further increases in recording density, and the like, are required. Consequently, even for optical elements, which are one component of such equipment, it is necessary to not only minimize geometric errors during the production of the optical elements but also to reduce to the extent possible the effects of distortion that occurs due to the holding of the optical elements.

However, in cases that optical elements are held using a conventional holding structure, sufficient optical performance cannot be obtained when distortion occurs in the optical elements, and this leads to the problem that the demand for higher resolution and higher definition cannot be met. For example, in cases such that the optical elements are mirrors, there is a risk that misalignment may occur in the direction of reflection of light from the light source, or the like, causing deterioration in image quality.

Further, in order to obtain light and large optical elements, or to produce optical elements in large volumes and low cost, optical elements may be formed using plastic. In cases such that the optical elements are made of materials with low stiffness, such as plastic, the potential for distortion to occur in the optical elements due to holding increases. This problem is particularly pronounced in relatively large optical elements that are lengthy in shape in the main scanning direction of the laser beam, such as fθ lenses or free-form surface mirrors arranged inside the abovementioned optical device of the image-forming device based on the electrophotographic system.

The present invention has been designed to resolve the above problems, and is intended to provide an optical element capable of reducing distortion caused by holding, a holding structure therefor, and an optical device.

Means for Solving the Problems

In order to solve the problems mentioned above, an optical element, identified for convenience as Item 1, has a first surface, a second surface on the opposite side of the first surface, an optical surface provided on at least one of the first and second surfaces, and a protruding part. The protruding part is held in a prescribed position by being in contact with a holding member. The protruding part comprises a first protruding part and a second protruding part. The first protruding part is formed on the first surface and comprises a first contact part that is a convex circular arc shape on at least one longitudinal plane and partly comes into contact with the holding member. The second protruding part is formed on the second surface and comprises a second contact part that is a convex circular arc shape on at least one longitudinal plane and partly comes into contact with the holding member. A circular arc constitutes the first contact part and a circular arc that constitutes the second contact part are present in at least one cross-section that passes through a contact point between the first contact part and the holding member as well as a contact point between the second contact part and the holding member, and the center of the circular arc that constitutes the first contact part is aligned with the center of the circular arc that constitutes the second protruding part.

Moreover, in order to solve the problems mentioned above, the optical element, identified for convenience as Item 2, is the optical element according to Item 1, wherein the first protruding part and/or the second protruding part have/has a spherical shape.

Moreover, in order to solve the problems mentioned above, the optical element, identified for convenience as Item 3, is the optical element according to Item 1, wherein the first protruding part and/or the second protruding part have/has a cylindrical shape.

Moreover, in order to solve the problems mentioned above, the optical element, identified for convenience as Item 4, is the optical element according to Item 1, wherein the radius of the circular arc that constitutes the first contact part is equivalent to the radius of the circular arc that constitutes the second contact part.

Moreover, in order to solve the problems mentioned above, the optical element, identified for convenience as Item 5, is the optical element according to Item 1, wherein the radius of the circular arc that constitutes the first contact part is different from the radius of the circular arc that constitutes the second contact part.

Moreover, in order to solve the problems mentioned above, the optical element, identified for convenience as Item 6, is the optical element according to Item 1, wherein an inclined surface is formed on at least one of the first protruding part and the second protruding part.

Moreover, in order to solve the problems mentioned above, the optical element, identified for convenience as Item 7, is the optical element according to Item 1, wherein the optical element has dimensions that are long in a first direction and short in a second direction perpendicular to the first direction.

Moreover, in order to solve the problems mentioned above, the optical element, identified for convenience as Item 8, is the optical element according to Item 7, wherein the protruding part is provided closer to the edge from the center of the optical element in the first direction.

Moreover, in order to solve the problems mentioned above, the optical element, identified for convenience as Item 9, is the optical element according to Item 1, wherein the first protruding part and the second protruding part are formed in an integrated manner on the first surface and the second surface, respectively.

Moreover, in order to solve the problems mentioned above, the optical element, identified for convenience as Item 10, is the optical element according to Item 1, wherein the optical element comprises a plurality of the protruding parts.

Moreover, in order to solve the problems mentioned above, the optical element, identified for convenience as Item 11, is the optical element according to Item 8, wherein at least one protruding part is respectively provided closer to one end and the other end from the center of the optical element in the first direction.

Moreover, in order to solve the problems mentioned above, the optical element, identified for convenience as Item 12, is the optical element according to Item 1, wherein the optical element is composed of plastic.

A holding structure, identified for convenience as Item 13, is provided for holding the optical element according to Item 1 at a prescribed position uses a holding member. The holding member comprises a first holding part and a second holding part. The first holding part has a first flat surface that comes into contact with the first protruding part. The second holding part has a second flat surface that comes into contact with the second protruding part and is arranged parallel to the first flat surface.

A holding structure, identified for convenience as Item 14, is provided for holding according to Item 1 at a prescribed position uses a holding member. The holding member comprises a first holding part and a second holding part. The first holding part comes into contact with the first protruding part. The second holding part comes into contact with the second protruding part. At least one of the first and second holding parts has a restricting member that restricts the movement of the centers of the circular arcs of the first and second contact parts of the optical element.

Moreover, in order to solve the problems mentioned above, the holding structure, identified for convenience as Item 15, is the holding structure according to Item 14, wherein one of the first and second holding parts has the restricting member that restricts the movement of the centers of the circular arcs of the first and second contact parts of the optical element, and the remaining part of either the first or second holding part is a flat surface.

Moreover, in order to solve the problems mentioned above, the holding structure, identified for convenience as Item 16, is the holding structure according to Item 13, wherein the holding structure comprises a biasing means for biasing at least one of the first and second holding parts toward the first or second protruding part.

Moreover, in order to solve the problems mentioned above, the optical device, identified for convenience as Item 17, comprises the optical element according to Item 1 and the holding structure according to Item 13.

Moreover, in order to solve the problems mentioned above, the optical element identified for convenience as Item 18, is the optical element according to Item 6, wherein the optical element has dimensions that are long in a first direction and short in a second direction perpendicular to the first direction.

Moreover, in order to solve the problems mentioned above, the optical element identified for convenience as Item 19, the optical element according to Item 8, wherein the first protruding part and the second protruding part are formed in an integrated manner on the first surface and the second surface, respectively.

Moreover, in order to solve the problems mentioned above, the optical element identified for convenience as Item 20, is the optical element according to Item 11, wherein the optical element is composed of plastic.

Effects of the Invention

In the present invention, in at least one cross-section that passes through a contact point between a first contact part and a holding member as well as a contact point between a second contact part and the holding member, a circular arc having the first contact part and a circular arc having the second contact part are present, and a first protruding part and a second protruding part are arranged so that the center of the circular arc having the first protruding part is aligned with the center of the circular art having the second protruding part. As a result, when the invention is held by a holding member, since the vector of the force being applied to the protruding parts from different directions is always directed to the same point (the center of the circle), this reduces the potential for misalignment due to moment. Consequently, it becomes possible to reduce distortion that occurs in the optical elements due to holding.

MODES FOR CARRYING OUT THE INVENTION

<Embodiment>
[Image-Forming Device]

Figure 1:
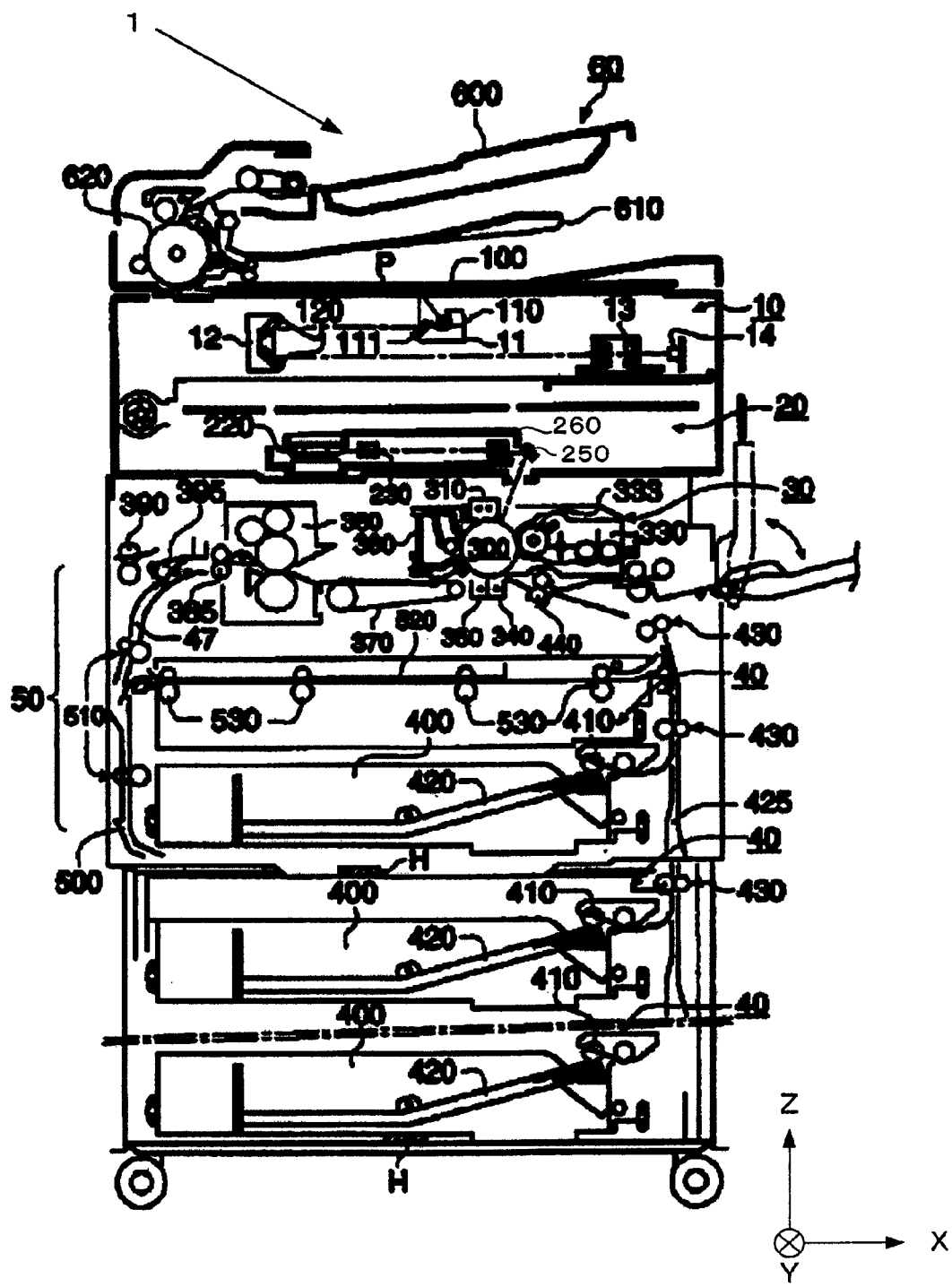
FIG. 1 It is a diagram showing an outline configuration of an image-forming device according to an embodiment.

An image-forming device 1 according to an embodiment is described with reference to FIG. 1. FIG. 1 shows an outline configuration of the image-forming device 1 according to the embodiment. Here, the image-forming device 1 is described using an electrophotographic multi-function peripheral as an example. In the present embodiment, the perpendicular direction of the image-forming device 1 is the Z-direction, and in the flat surface perpendicular to the Z-direction, the width direction of the image-forming device 1 is the X-direction and the depth direction of the image-forming device 1 is the Y-direction.

The image-forming device 1 is configured including an image-reading part 10, a laser writing part 20, an image-forming part 30, a paper feeding part 40, and a transfer material inversion part 50, An automatic paper feeding device 60 is arranged on the image-reading part 10. The automatic paper feeding device 60 includes a paper loading stand 600, a processed-paper storage stand 610, and a drum 620, and is also configured including multiple rollers, a passage switching member, and the like, arranged in the periphery. When a paper is placed on a paper tray manually, it is not necessary to use the automatic paper feeding device 60.

The image-reading part 10 includes an optical system including a first mirror unit 11, which is capable of back-and-forth movement in the X-direction in FIG. 1, a second mirror unit 12, which is capable of parallel movement at a half the speed of the first mirror unit 11 so as to maintain the optical path length, a projection lens 13, and an imaging element 14. The first mirror unit 11 includes an illumination lamp 110, which is made of glass and illuminates a paper P placed on a paper tray 100, and a mirror 111. The second mirror unit 12 includes a pair of mirrors 120 arranged in a V-shape. Image information that is formed into an image in the imaging element 14 undergoes image processing, and is stored once in a memory as image data.

The laser writing part 20 is configured including a light source part 210 (not illustrated in FIG. 1), a rotating mirror 220, a fθ lens 230 as an example of the "optical element", a holding member 240 (not illustrated in FIG. 1) as an example of the "holding mechanism", mirror 250, and a frame body 260. Details of the laser writing part 20 are described later. The laser writing part 20 is an example of the "optical device".

The image-forming part 30 is a device that reverses an image that has been read by the image-reading part 10 on a transfer material, and includes a drum-shaped charge-retaining body (hereinafter, referred to as a photosensitive drum 300), an electrifying electrode 310 which is arranged near the photosensitive drum 300 and electrostatically charges the periphery of the photosensitive drum 300 in a uniform manner, a developer apparatus 330 having a development sleeve 333 that generates laser beams from the laser writing part 20 to convert an electrostatic latent image formed on the photosensitive drum 300 into a visible toner image, a transfer electrode 340 that transfers the toner image onto the transfer material, a separator electrode 350 that separates the transfer material from the periphery of the photosensitive drum 300, and a cleaning means 360 that cleans the photosensitive drum 300 after the transfer.

The reflected light from the mirror 250 of the laser writing part 20 passes between the electrifying electrode 310 and the developer apparatus 330, and is irradiated to the photosensitive drum 300.

Furthermore, the image-forming part 30 includes a conveyor belt 370, an anchorage device 380 having a pair of rollers configured to rotate due to pressure bonding with the conveyor belt 370, paper discharging means 385 and 390 respectively having a pair of rollers, and a switching member 395 which switches the passage of the transfer material after the bonding.

The paper feeding part 40 is a device that feeds a sheet-shaped transfer material 420, such as paper, to the image-forming part 30, and its main components are a paper feed tray 400, which is arranged below the image-forming part 30, and a paper feed roller 410. In FIG. 1, three instances of the paper feed tray 400 are arranged, the top paper feed tray 400 being built into the image-forming device and the lower two paper feed trays 400 being optional (installed afterward).

In the lower space of the paper feed tray 400, in addition to the paper feeding part 40, there are also the image-reading part 10, the laser writing part 20, the image-forming part 30, and a dehumidification heater H which dehumidifies the transfer material inversion part 50. For the dehumidification heater H, a PTC heater is used, however, another type of heater may be used. Moreover, the dehumidification heater H may be arranged in another location of the image-forming device, and multiple instances thereof may be installed.

Also included are a conveyer roller 430, which is arranged on the a feeding passage 425 of the transfer material 420, and a resister roller 440 which re-transmits the transfer material 420 so that it is superimposed with the toner image formed on the photosensitive drum 300. For the transfer material 420, a medium, such as paper or film, is used.

The transfer material inversion part 50 includes a conveyer path 500 formed downward from the switching member 395, a pair of conveyer rollers 510 provided above the conveyer path 500, a conveyer path 525 which extends in a direction perpendicular to the conveyer path 500 from the middle of the conveyer path 500 and is connected to the feeding passage 425, and a pair of conveyer rollers 520 arranged above the conveyer path 525.

[Laser Writing Part]

Figure 2:
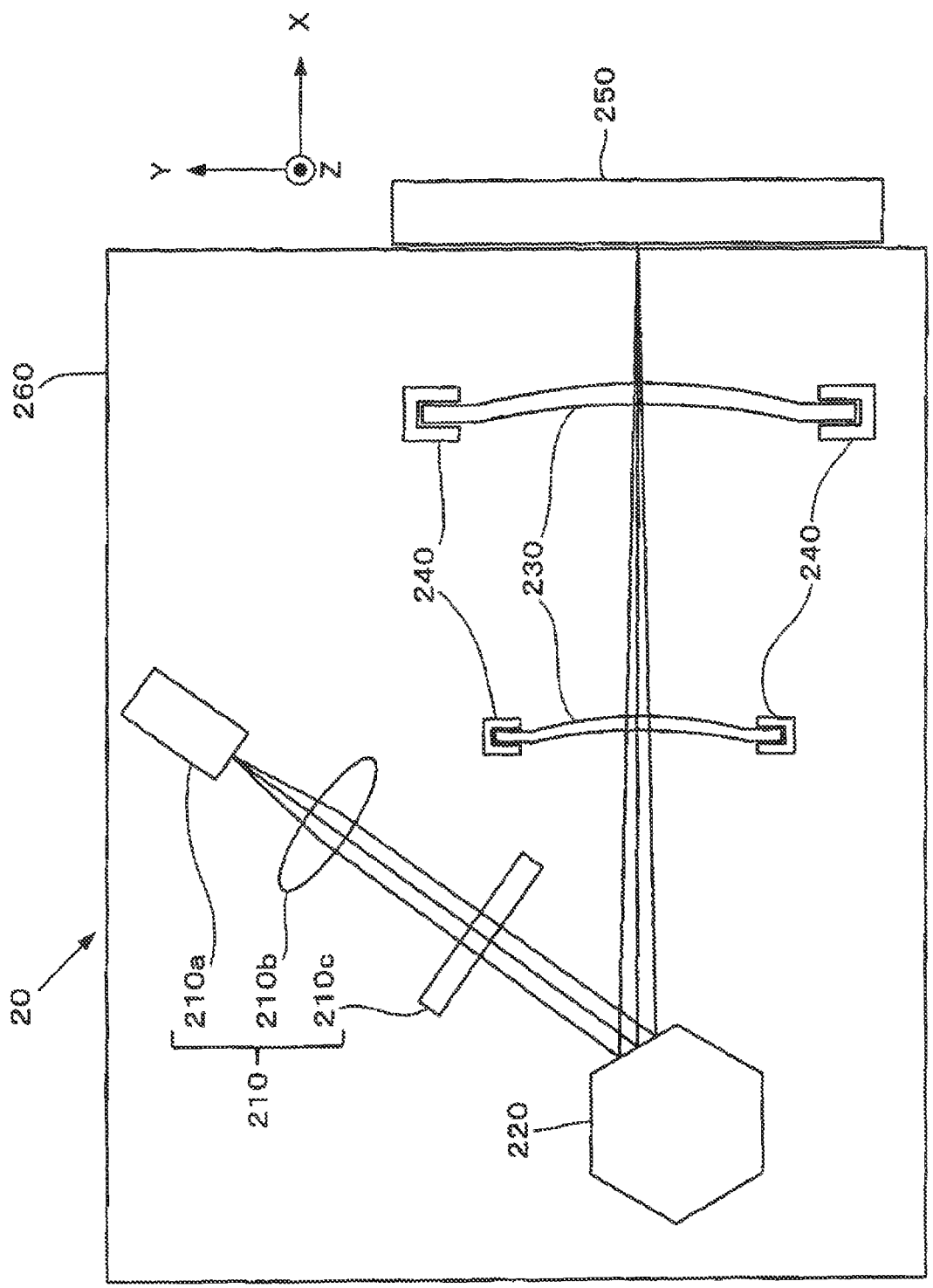
FIG. 2 It is a diagram showing an outline configuration of a laser writing part according to the embodiment.

Next, with reference to FIG. 2, a detailed configuration of the laser writing part 20 according to the embodiment is described. FIG. 2 shows the laser writing part 20 in FIG. 1 seen from the Z-direction.

As described above, the laser writing part 20 is configured including the light source part 210, the rotating mirror 220, the fθ lenses 230, the holding members 240, the mirror 250, and the frame body 260. The light source part 210, the rotating mirror 220, the fθ lenses 230 and the holding members 240 are arranged at prescribed positions of the frame body 260.

The light source part 210 is configured including, for example, a semiconductor laser diode 210a, a collimate lens 210b, and a cylindrical lens 210c. Light from the semiconductor laser diode 210a transmits the collimate lens 210b and the cylindrical lens 210c, and is guided to the rotating mirror 220.

The rotating mirror 220 is, for example, a polygon mirror having multiple reflecting surfaces. By rotating at a high velocity about its perpendicular axis, the rotating mirror 220 reflects the light from the light source part 210 with its reflecting surface, and deflects the light to prescribed directions.

The fθ lens 230 is an optical element for focusing the light deflected from the rotating mirror 220 and guiding the light to the mirror 250. In the present embodiment, there are two instances of the fθ lens 230, however, there are no limitations to the number thereof. For example, a single instance of the fθ lens 230 is acceptable. The fθ lens 230 is held at a prescribed position inside the laser writing part 20 by the holding member 240, which is assembled on the bottom surface inside the frame body 260. Detailed configurations of the fθ lens 230 and the holding member 240 are described later.

The Mirror 250 is a member that reflects the light that has transmitted the fθ lens 230 toward the photosensitive drum 300.

[fθ Lens]

Figure 3:
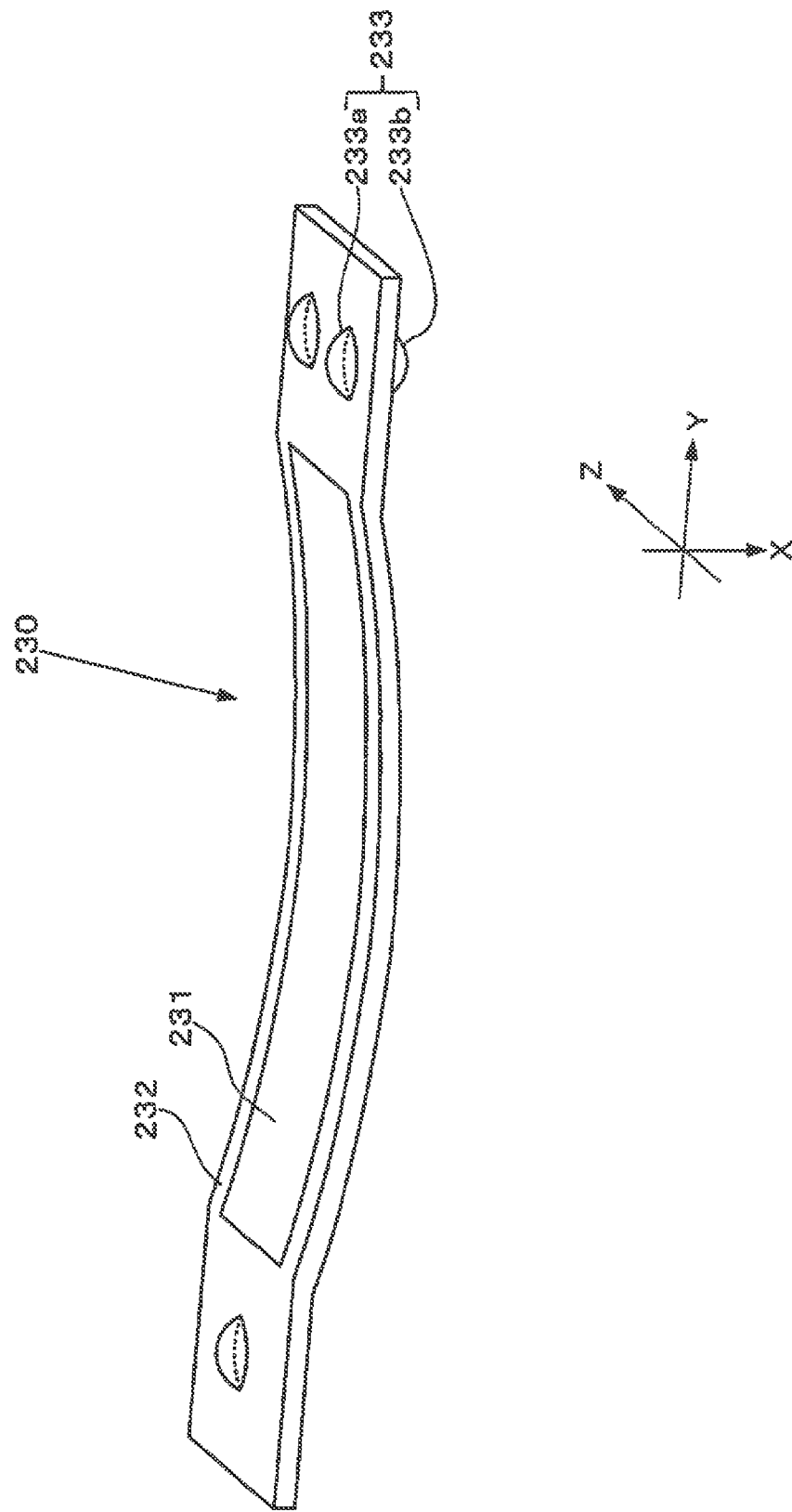
FIG. 3 It is a diagram showing an fθ lens according to the embodiment.
Figure 4:
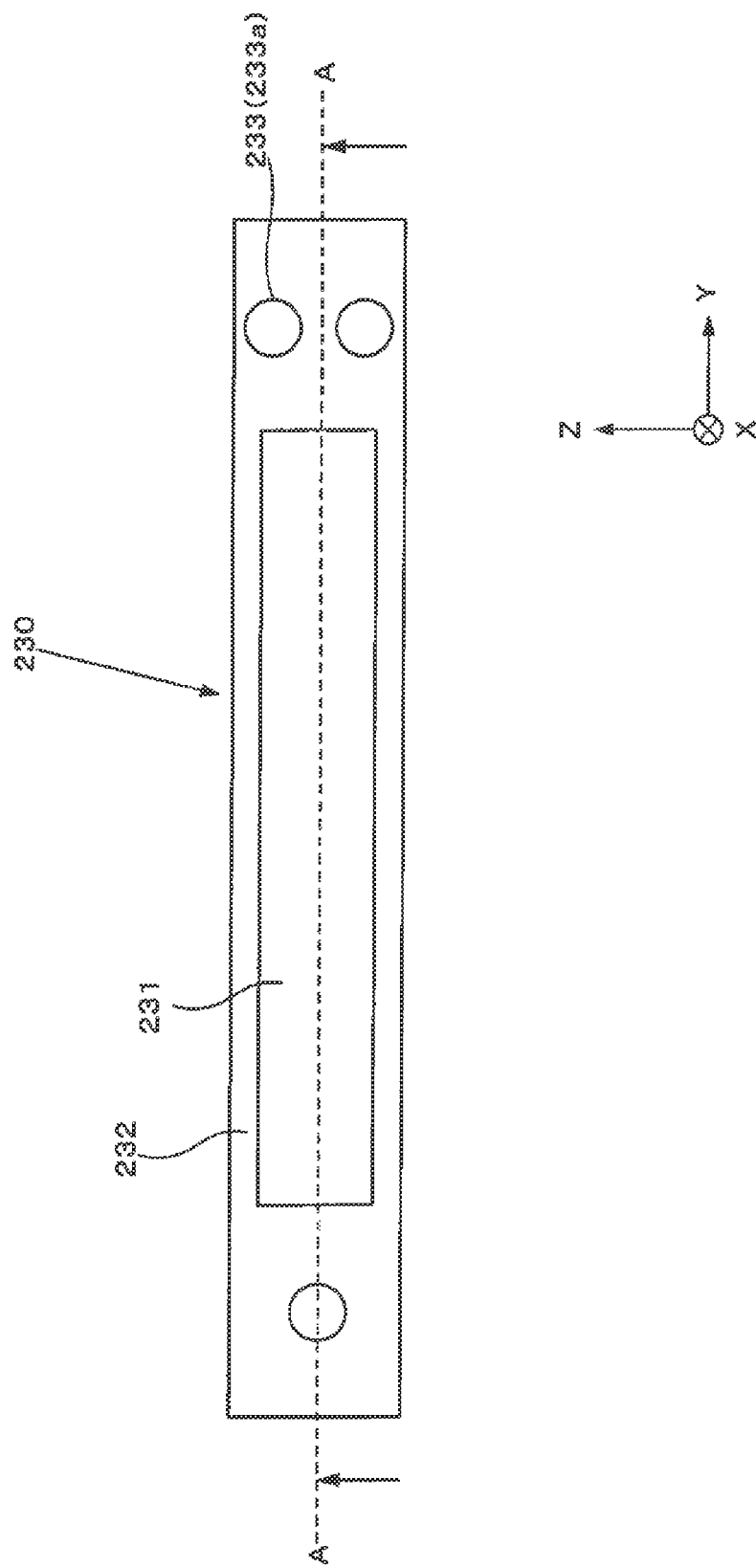
FIG. 4 It is a diagram showing the fθ lens according to the embodiment.
Figure 5:
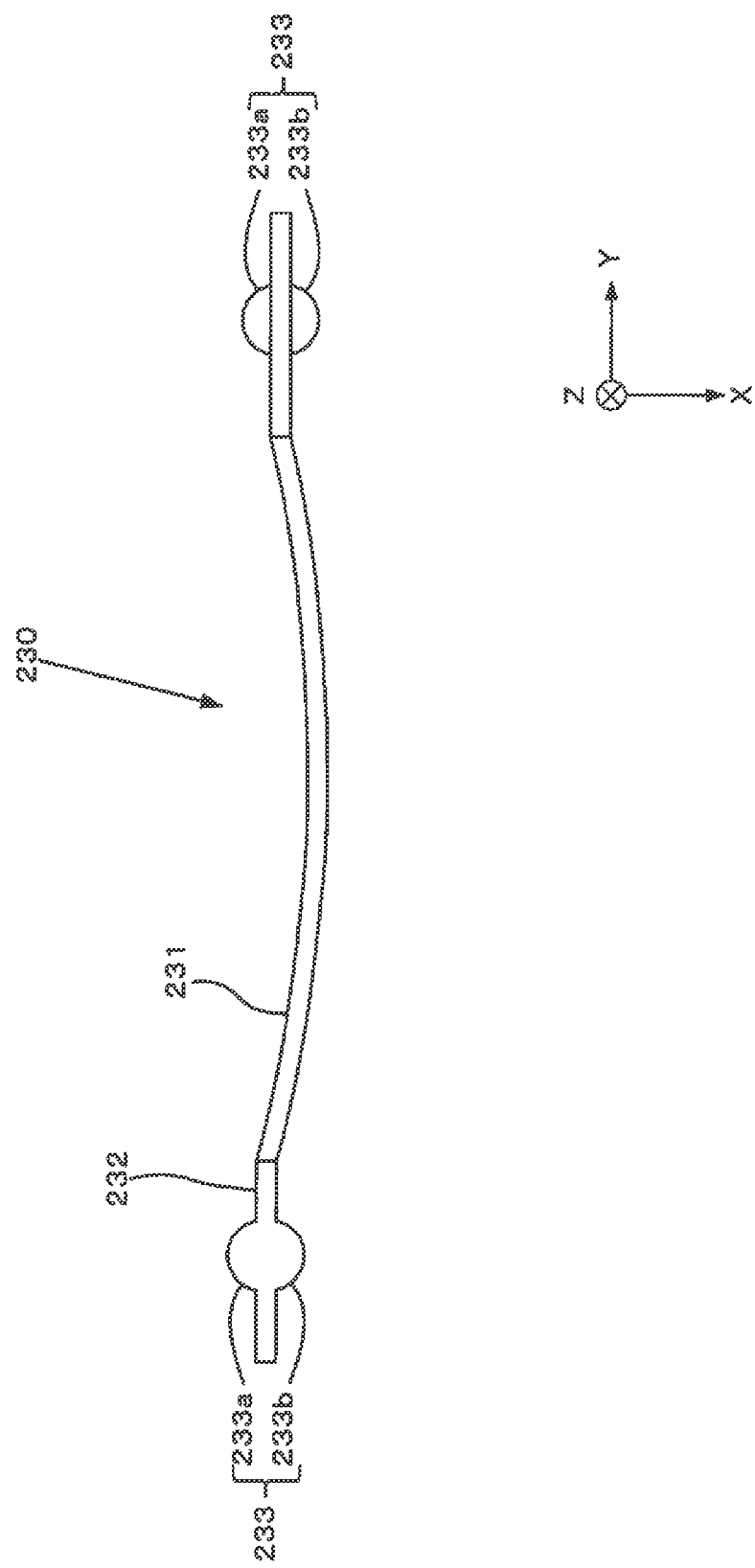
FIG. 5 It is a diagram showing the fθ lens according to the embodiment.

Next, with reference to FIGS. 3 through 5, a detailed configuration of the fθ lens 230 according to the embodiment is described. FIG. 3 is a perspective view of the fθ lens 230. FIG. 4 is a diagram showing the fθ lens 230 seen from the X-direction. FIG. 5 is a diagram showing the cross-section taken from line A-A of FIG. 4.

The fθ lens 230 is a long thin bow-shaped member that has the Y-direction as the longitudinal direction and the Z-direction as the short direction when arranged on the laser writing part 20, and is a member that is formed in an integrated manner using a translucent material made of plastic, such as thermoplastic resin. The fθ lens 230 has a first surface that is on the laser incidence side, and a second surface that is opposite of the first surface. Further, the fθ lens 230 is configured including a lens part 231, which extends from near the center toward the both ends, a peripheral part 232, and a protruding part 233.

The lens part 231 has a curved lens surface (optical surface) that causes the light from the rotating mirror 220 to be incident to the first surface, and then the light to transmit through the second surface. The peripheral part 232 is provided around the respective lens surfaces of the first surface and the second surface. The peripheral part 232 is configured including a flat surface on which the protruding part 233 is provided, and a curved surface that is curved along the shape of the lens part 231. In the present embodiment, the lens part 231 and the curved surface (part of the peripheral part 232) have a prescribed curvature, however, as long as optical functionality equivalent to that of the present embodiment can be achieved through adjustments, or the like, of the shape of the optical surface, the curvature of the lens part 231 may be reduced, or the lens part 231 may be made flat. Further, in the present embodiment, the peripheral part 232 includes the flat part and the curved part, however, the entirety of the peripheral part 232 may be curved.

Multiple instances of the protruding part 233 are provided on the peripheral part 232. In the present embodiment, three instances of the protruding part 233 are provided on the flat surface of the peripheral part 232. As a result of each protruding part 233 coming into contact with the holding member 240, the fθ lens 230 is held at a prescribed position.

Each protruding part 233 is configured including a pair of protruding parts 233a and 233b. Hereinafter, the protruding part 233a is referred to as a "first protruding part 233a", and the protruding part 233b is referred to as a "second protruding part 233b". In the present embodiment, the first protruding part 233a is formed in an integrated manner on the first surface when the fθ lens 230 is formed. The second protruding part 233b is formed in an integrated manner on the second surface when the fθ lens 230 is formed.

As shown in FIG. 5, the first protruding part 233a is formed on the first surface of the fθ lens 230 (the peripheral part 232), and the surface shape of the cross-section cut along the XV plane forms a convex circular arc shape. Further, the second protruding part 233b is formed on the second surface of the fθ lens 230 (peripheral part 232), and the surface shape of the cross-section cut along the XY plane forms a convex circular arc shape. Furthermore, as shown in FIG. 3, in the present embodiment, the first protruding part 233a and the second protruding part 233b form the shape of a spherical surface.

The spherical surface of the first protruding part 233a is the first contact part that comes into contact with the holding member 240. The spherical surface of the second protruding part 233b is the second contact part that comes into contact with the holding member 240. A part of the first contact part and a part of the second contact part come into contact with the holding member 240, respectively. Since the first contact part and the second contact part are spherical surfaces, the both parts respectively form convex circular arc shapes in at least one longitudinal plane, for example, in the cross-section cut along the XY plane that passes through the apexes of the spherical surfaces. A part of each of the circle arcs comes into contact with the holding member 240 (refer to FIG. 6).

Figure 6:
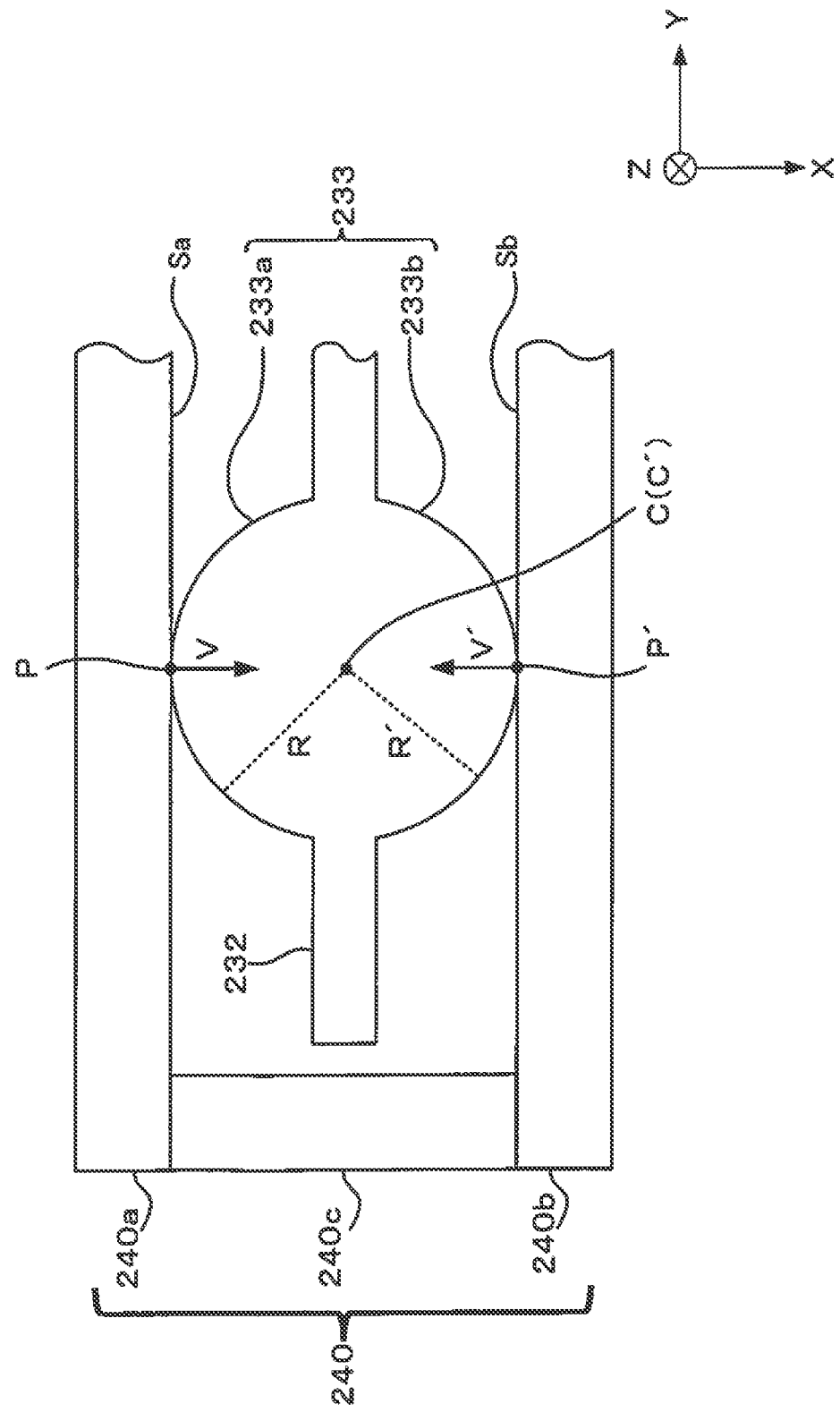
FIG. 6 It is a diagram showing a holding member and the fθ lens held by the holding member according to the embodiment.

Here, the first protruding part 233a and the second protruding part 233b are formed so that, in the longitudinal plane (here, the cross-section cut along the XY plane) that passes through a point P where the first protruding part 233a comes into contact with the holding member 240 and a point P' where the second protruding part 233b comes into contact with the holding member 240, a center C of the circle arc having the first contact part of the first protruding part 233a is aligned with a center C' of the circle arc having the second contact part of the second protruding part 233b (refer to FIG. 6). Further, in the present embodiment, in the longitudinal plane, a radius R of the circle arc having the first contact part of the first protruding part 233a is equivalent to a radius R' of the circle arc having the second contact part of the second protruding part 233b (refer to FIG. 6). In other words, in the longitudinal plane, the curvature of the first contact part of the first protruding part 233a is equivalent to the curvature of the second contact part of the second protruding part 233b. It should be noted that the circle center C and the circle center C' do not need to match as long as the centers are within an error margin, and in such the case, it can be considered that the centers are practically aligned.

Furthermore, in the present embodiment, the center of the fθ lens 230 in the thickness direction (X-direction) is roughly aligned with the circle center C of the first protruding part 233a and the circle center C' of the second protruding part 233b, however, the present invention is not limited to this configuration. For example, the circle center C of the first protruding part 233a and the circle center C' of the second protruding part 233b may be higher or lower in the thickness direction of the fθ lens 230 relative to the center of the fθ lens 230 in the thickness direction.

The protruding part 233 is preferably arranged closer to the edge from the center part in the longitudinal direction (Y-direction) of the fθ lens 230, and is preferably arranged outside of the lens part 231. Further, in the present embodiment, the protruding part 233 is arranged at the center of the peripheral part 232 on both ends in the longitudinal direction of the fθ lens 230, however, the present invention is not limited to this, and the protruding part 233 may be arranged adjacent to the lens part 231, or near the farthest point from the center part in the longitudinal direction of the fθ lens 230.

The protruding part 233 is preferably arranged on both ends in the longitudinal direction of the fθ lens 230, and it is particularly favorable to arrange the protruding part 233 in one location on one end in the longitudinal direction of the fθ lens 230 and in two locations on the other end (total of three locations) so as to surround the center of the lens part 231 as in the present embodiment. When the protruding part 233 is provided in fewer than three locations, it is difficult to hold the fθ lens 230 with sufficient stability simply by holding the fθ lens 230 via each of the protruding parts 233, and as a result, a separate holding means becomes necessary. Consequently, the configuration of the optical device may become complicated, or the potential for distortion of the fθ lens 230 may increase compared to the cases in which the protruding part 233 is provided in three or more locations. When the protruding part 233 is provided in four or more locations, the accuracy required for the shape and size of the optical elements as well as the arrangement positions of the holding members 240 increases in order to prevent differences in the heights of each protruding part 233 or positional misalignment of the holding members 240 (misalignment of contact positions with the protruding parts 233). The reason for this is that if there are differences in the heights of each protruding parts 233 or if the holding members 240 are arranged at misaligned positions from the designed position, when the fθ lens 230 is held, the fθ lens 230 may become deformed in order to resolve the abovementioned differences in the heights of each of the protruding parts 233 or positional misalignment of the holding members 240, and as a result, this may cause distortion of the shape of the fθ lens 230. If the protruding part 233 is present at three locations surrounding the center of the lens part 231 and only these parts come into contact with the holding member 240, a flat plane can be defined in a consistent manner, and therefore, it becomes possible to hold the fθ lens 230 at a prescribed position in a stable manner.

The first protruding part 233a and the second protruding part 233b are preferably formed in an integrated manner on the fθ lens 230 as described in the present embodiment. Although it is possible to attach the protruding part 233 to the fθ lens 230 as a separate body, if the protruding part 233 is formed on the fθ lens 230 in an integrated manner, the positional relationship between the protruding part 233 and the lens part 231 becomes fixed during formation, and it becomes easier to hold the fθ lens 230 in accordance with the design values without an errors during the attachment of the protruding part 233 or changes over time in the positional relationship between the protruding part 233 and the lens part 231 after the fθ lens 230 is held.

Further, although it depends on the shape, material, and the like, of the optical elements, in most cases, it is possible to effectively avoid distortion resulting from the holding by using thin optical elements in which the relationship between the thickness and the longitudinal length of the optical elements is within the following range.

[Formula 1]

$$0.2 < \text{Thickness of optical element/Longitudinal length of optical element} < 0.01$$

Furthermore, the surfaces of the protruding part 233 and the holding member 240 are preferably flat and smooth, and although the present invention is not limited to this, the mean of a surface roughness Ra is preferably less than or equal to 1 μm.

[Holding Structure]

Figure 7:
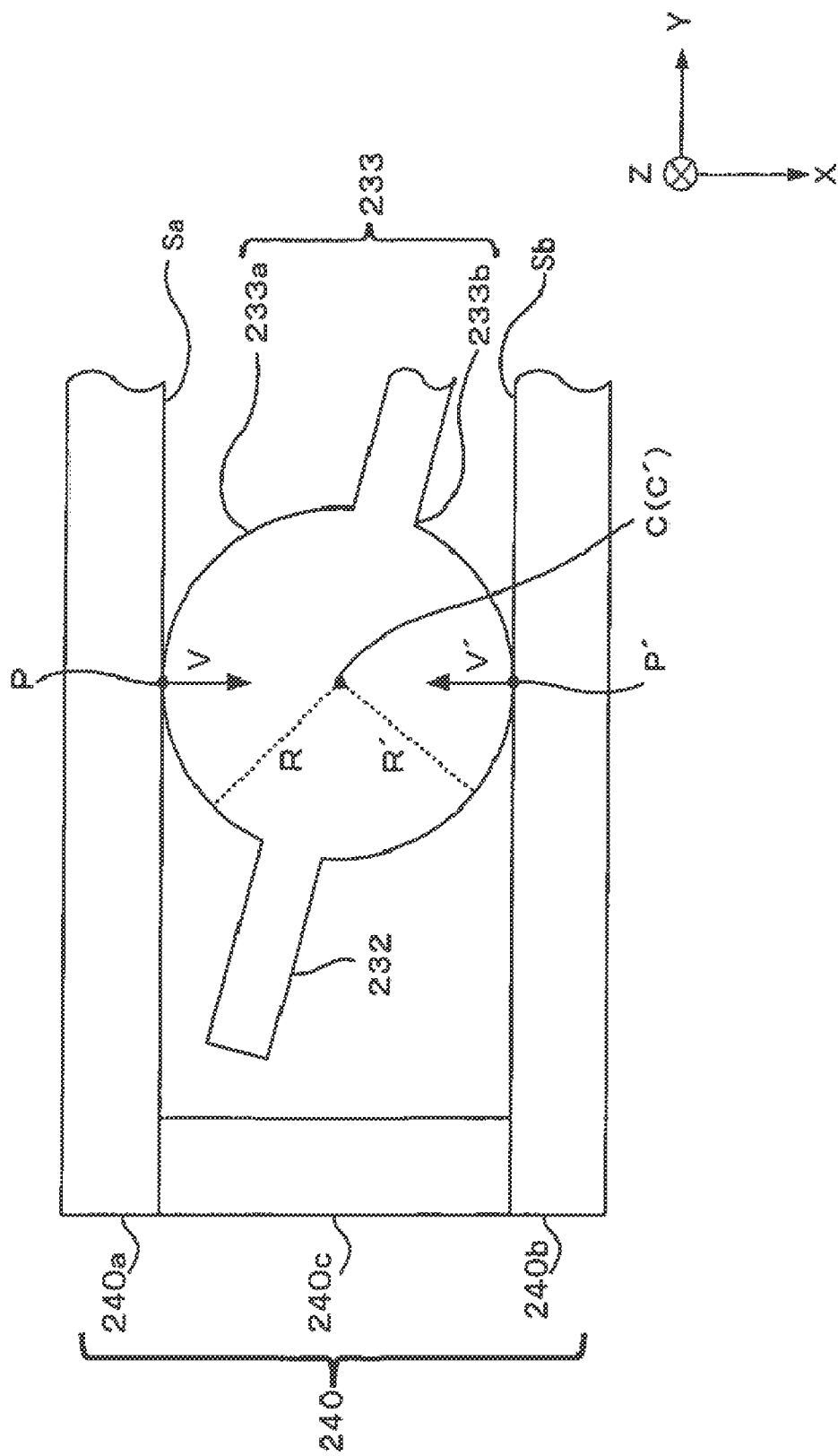
FIG. 7 It is a diagram showing the holding member and the fθ lens held by the holding member according to the embodiment.

Next, with reference to FIGS. 6 and 7, a holding structure according to the embodiment is described. FIGS. 6 and 7 show the fθ lens 230 held by the holding member 240. Although FIGS. 6 and 7 show only one instance of the protruding part 233 and the holding member 240, other instances of the protruding part 233 and the holding member 240 also have a similar holding structure. In other words, the number of instances of the holding member 240 is equivalent to the number of instances of the protruding part 233. However, when multiple instances of the protruding part 233 are arranged on one end in the longitudinal direction of the fθ lens 230, a single holding member 240, which comes into contact with the all instances of the protruding part 233 simultaneously, may be used to hold the multiple instances of the protruding part 233.

The holding member 240 is configured including a first holding part 240a, a second holding part 240b, and a connecting part 240c. On the first holding part 240a, when the fθ lens 230 is held by the holding member 240, a holding surface Sa (first flat surface) which comes into contact with a certain point (point P) of the first protruding part 233a is formed. On the second holding part 240b, when the fθ lens 230 is held by the holding member 240, a holding surface Sb (second flat surface) which comes into contact with a certain point (point P') of the second protruding part 233b is formed. The first holding part 240a and the second holding part 240b are arranged so that the holding surface Sa and the holding surface Sb become parallel. The connecting part 240c connects the first holding part 240a and the second holding part 240b. Here, it is preferable to configure at least one of the first holding part 240a and the second holding part 240b using an elastic member, or to bias at least one of the first holding part 240a and the second holding part 240b toward the protruding part 233 (the first protruding part 233a or the second protruding part 233b) by pressing with an elastic body. The holding member 240 may also be configured by making one of the first holding part 240a and the second holding part 240b a fixed member that is fixed to the frame body 260 and the other an elastic member, such as a spring board, that is fixed to the frame body 260. Elastic members and elastic bodies in the present embodiment constitute an example of a "biasing means".

As shown in FIG. 6, when the fθ lens 230 is arranged parallel to the holding member 240 (the holding surface Sa and the holding surface Sb), the holding surface Sa presses the first protruding part 233a and the holding surface Sb presses the second protruding part 233b. At this time, a vector V of the force applied to the point P where the first protruding part 233a comes into contact with the holding surface Sa and a vector V' of the force applied to the point P' where the second protruding part 233b comes into contact with the holding surface Sb are both directed to the circle center C (C'). As a result, the fθ lens 230 is held at a prescribed position without being affected by the rotational moment.

On the other hand, as shown in FIG. 7, even when the fθ lens 230 is arranged tilted relative to the holding member 240 (the holding surface Sa and the holding surface Sb), the vector V of the force applied to the point P where the first protruding part 233a comes into contact with the holding surface Sa and the vector V' of the force applied to the point P' where the second protruding part 233b comes into contact with the holding surface Sb are both directed to the circle center C (C). As a result, the fθ lens 230 is held at a prescribed position without being affected by the rotational moment.

[Operation and Effect]

The operation and effect of the present embodiment are described below.

The optical element (the fθ lens 230) according to the present embodiment includes the protruding part 233, and is held at a prescribed position as a result of the protruding part 233 coming into contact with the holding member 240. The protruding part 233 includes the first protruding part 233a and the second protruding part 233h. The first protruding part 233a is formed on the first surface of the optical element, and the surface shape along at least one longitudinal plane (in this embodiment, the cross-section cut along the XY plane) has a circular arc shape. The second protruding part 233b is formed on the second surface of the optical element, and the surface shape along at least one longitudinal plane (in this embodiment, the cross-section cut along the XY plane) becomes a circular arc shape. These circle arcs constitute the first contact part and the second contact part, respectively, and some parts of these arcs come into contact with the holding member 240. The first protruding part 233a and the second protruding part 233b are also formed in a manner such that, in at least one longitudinal plane (in this embodiment, the cross-section cut along the XY plane) that passes through the point P where the first protruding part 233a comes into contact with the holding member 240 and the point F' where the second protruding part 233b comes into contact with the holding member 240, the arc having the first contact part and the arc having the second contact part are present, and in that longitudinal plane, the center C of the arc having the first contact part is aligned with the center C' of the arc having the second protruding part.

The holding structure according to the present embodiment also holds the optical element (the fθ lens 230) in a prescribed position by having the element held by the holding member 240. The optical element includes the first protruding part 233a and the second protruding part 233b which are configured as described above, and the holding member 240 includes the first holding part 240a and the second holding part 240b. First holding part 240a includes the holding surface Sa which comes into contact with the first protruding part 233a. The second holding part 240b includes the holding surface Sb which comes into contact with the second protruding part 233b and is arranged parallel to the holding surface Sa.

In this way, the first protruding part 233a and the second protruding part 233b which have circular arc cross-section surface shapes are arranged so that the respective circle centers C (C') are aligned. Consequently, the vectors of the forces applied to the protruding part 233 from different directions are always directed to the same point (the circle center C (C')). In other words, in this configuration, misaligned caused by the moment due to the holding of the optical element is unlikely to occur. Based on the above, it becomes possible to reduce distortion that occurs in the optical element due to holding.

Further, in the optical element (the fθ lens 230) according to the present embodiment, the first protruding part 233a and the second protruding part 233b have a spherical shape.

In this way, by forming the protruding part 233 with a spherical shape, it becomes easy for the protruding part 233 to come into contact with the holding surface (the holding surface Sa and the holding surface Sb) of the holding member 240 at a point. Consequently, it becomes difficult for misalignment to occur in the directions of the forces being applied from the holding surface.

Moreover, in the optical element (the fθ lens 230) according to the present embodiment, the radius R of the cross-section at the point P where the first protruding part 233a comes into contact with the holding member 240 (the first holding part 240a) is equivalent to the radius R' of the cross-section at the point P' where the second protruding part 233b comes into contact with the holding member 240 (the second holding part 240b).

In this way, by making the radiuses of the first protruding part 233a and the second protruding part 233b equivalent, it becomes easy to design and produce optical elements in which the spherical centers of the first protruding part 233a and the second protruding part 233b (the circle centers of the arcs in the cross-sections) are aligned, and holding can be implemented with high accuracy while reducing the potential for distortion.

Modified Example 1

Figure 8:
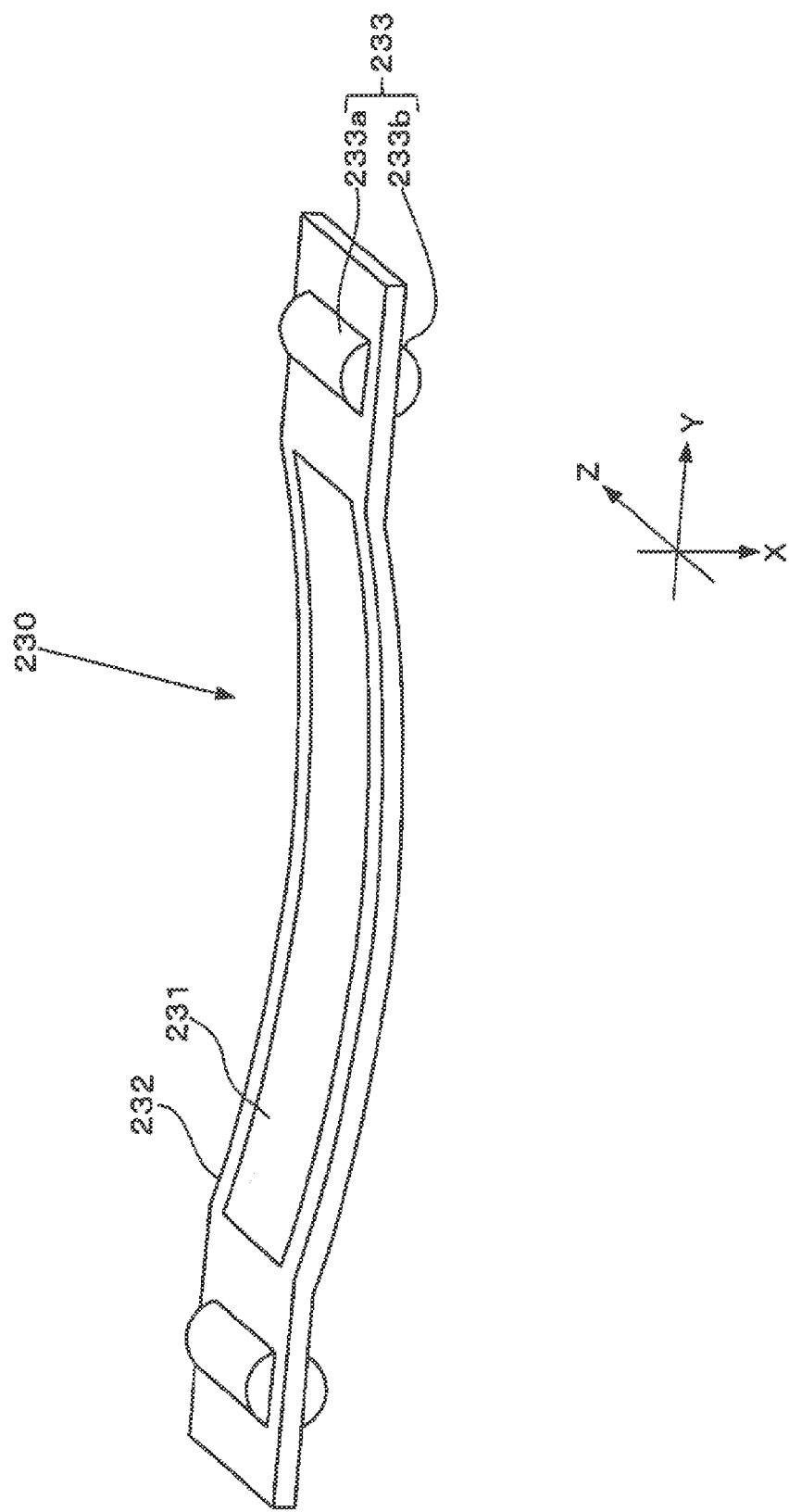
FIG. 8 It is a diagram showing the fθ lens according to a modified example 1.

As shown in FIG. 8, it is also possible to form the first protruding part 233a and the second protruding part 233b as a columnar shape. In a case that the fθ lens 230 having this type of the protruding part 233 is held using the holding member 240, the first protruding part 233a comes into contact with the first holding part 240a in a line containing the point P. Similarly, the second protruding part 233b comes into contact with the second holding part 240b in a line containing the point P'. On the other hand, in a case that the first holding part 240a and the second holding part 240b are formed as a cylindrical shape, the first protruding part 233a comes into contact with the first holding part 240a at a single point (the point P). Similarly, the second protruding part 233b comes into contact with the second holding part 240b at a single point (the point P').

Even when the first protruding part 233a and the second protruding part 233b are formed as the columnar shape, by providing the first protruding part 233a and the second protruding part 233b such that the circle center C and the circle center C' in the cross-section are aligned, the vector V of the force applied to the first protruding part 233a and the vector V' of the force applied to the second protruding part 233b are always directed to the same point (the circle center C (C')).

In this way, even when the first protruding part 233a and the second protruding part 233b are formed as the columnar shape, it is possible to reduce distortion that occurs in a defined direction due to the shape, or the like, of the optical elements. In other words, although the fθ lens 230 according to the present modified example is vulnerable to distortion in the longitudinal direction (the Y-direction), day providing the columnar-shaped protruding part 233 that extends in the Z-direction, it is possible to reduce distortion that occurs when the fθ lens 230 is held by the holding member 240.

As long as the first protruding part 233a and the second protruding part 233b is provided such that the circle center C and the circle center C' are aligned, it is also possible to form either the first protruding part 233a or the second protruding part 233b as the spherical shape and to form the other as the columnar shape.

Modified Example 2

Figure 9:
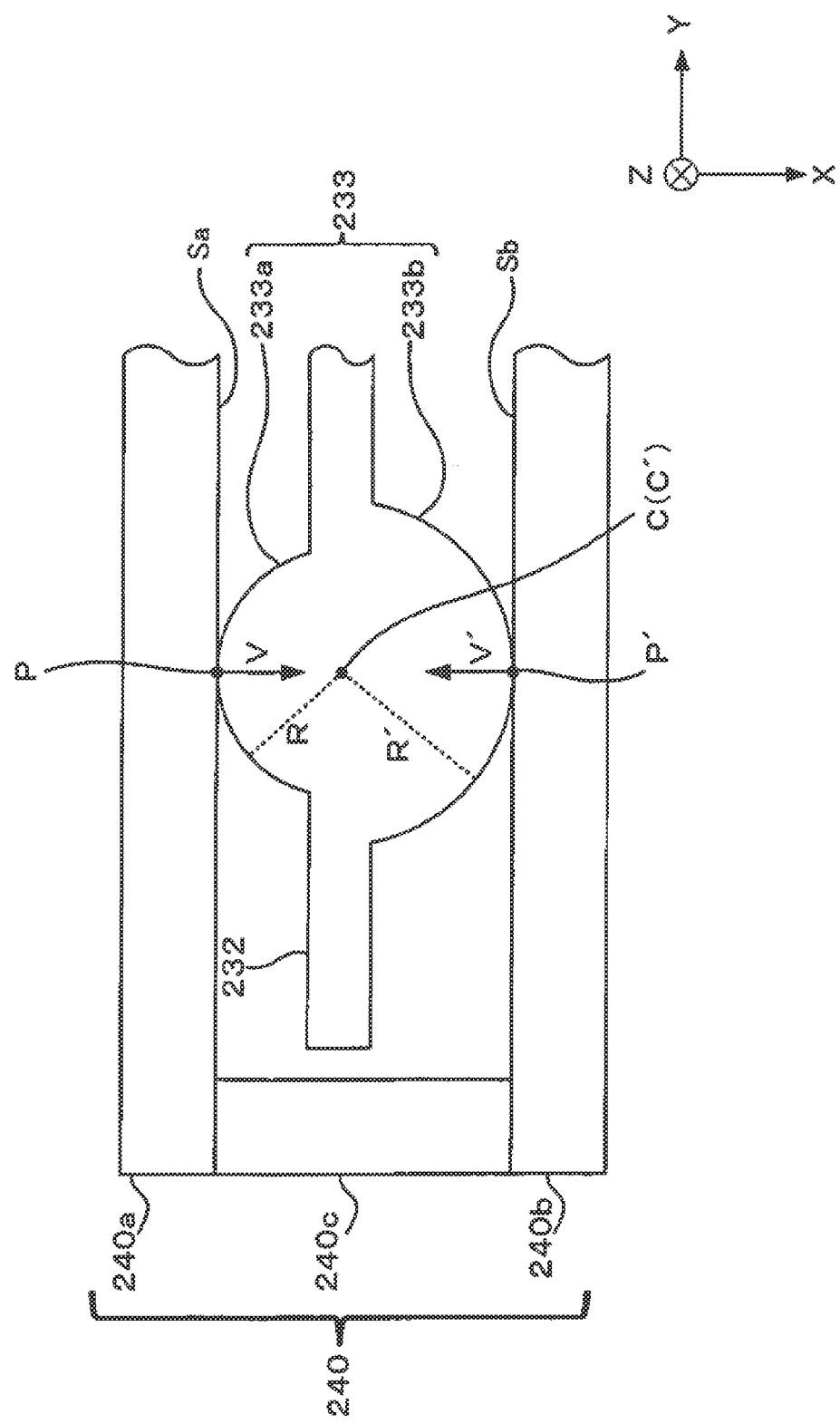
FIG. 9 It is a diagram showing the holding member and the fθ lens held by the holding member according to a modified example 2.

As shown in FIG. 9, it is also possible to make the radius R of the cross-section at the point P where the first protruding part 233a comes into contact with the first holding part 240a different from the radius R' of the cross-section at the point P' where the second protruding part 233b comes into contact with the second holding part 240b. In other words, the curvature of the cross-section at the point P where the first protruding part 233a comes into contact with the first holding part 240a is different from the curvature of the cross-section at the point P' where the second protruding part 233b comes into contact with the second holding part 240b.

Even when the radiuses are different, by providing the first protruding part 233a and the second protruding part 233b such that the circle center C and the circle center C' are aligned, the vector V of the force applied to the first protruding part 233a and the vector V' of the force applied to the second protruding part 233b are always directed to the same point (the circle center C (C')).

In this way, when the circle centers are aligned, it becomes possible to make the radius R different from the radius R', and therefore, it is possible to obtain a configuration in which the likelihood of misalignment of the forces acting from the holding member 240 is reduced while maintaining freedom of product configuration and design. Moreover, as described above, in a case that the circle centers are misaligned from the center in the upward and downward directions in the thickness direction of the optical element, when the circle radius of the arc is expanded in the holding surface facing the surface closer to the circle center from among the first surface and the second surface of the optical element, it becomes easier to prevent interference between the holding member 240 and the optical element.

Modified Example 3

Figure 10:
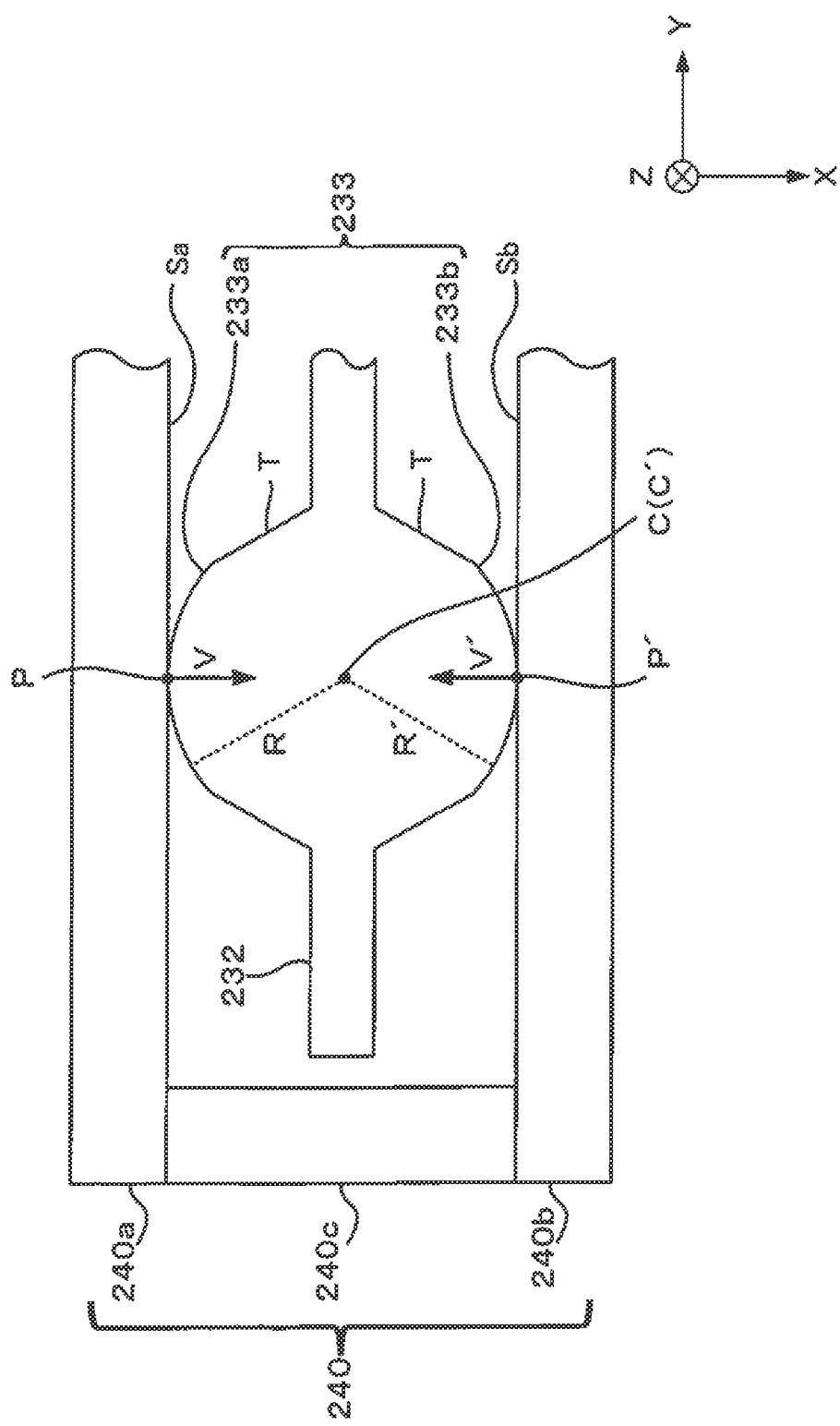
FIG. 10 It is a diagram showing the holding member and the fθ lens held by the holding member according to a modified example 3.

As shown in FIG. 10, it is also possible to provide a tapered surface T, which is an inclined surface, on both the first protruding part 233a and the second protruding part 233b. The tapered surface T is provided in a part outside the region where the first protruding part 233a (the second protruding part 233b) comes into contact with first holding part 240a (the second holding part 240b). In the present modified example, the tapered surface T is inclined such that the surface T spreads from the arc of the first protruding part 233a (the second protruding part 233b) toward the first surface (the second surface) of the fθ lens 230.

In this way, by providing the tapered surface T to at least one of the first protruding part 233a and the second protruding part 233b, it become easy to separate the fθ lens 230, which is formed through resin molding, from the metal mold.

The tapered surface T may be provided to at least one of the first protruding part 233a and the second protruding part 233b. Moreover, as long as it is a configuration that is easy to separate from the mold, the configuration is not limited to a tapered form. For example, it is sufficient to provide an inclined surface on only a part of the overall periphery of the first protruding part 233a (the second protruding part 233b).

Modified Example 4

In the above embodiment, a configuration was described in which the holding surface Sa and the holding surface Sb of the holding member 240 are a pair of parallel flat surfaces, however, the present invention is not limited to this. For example, multiple convex parts 241 (spherical projections or columnar projections) may be provided on the holding member 240 to be contact with the protruding part 233 of the fθ lens 230 at multiple points.

Figure 11:
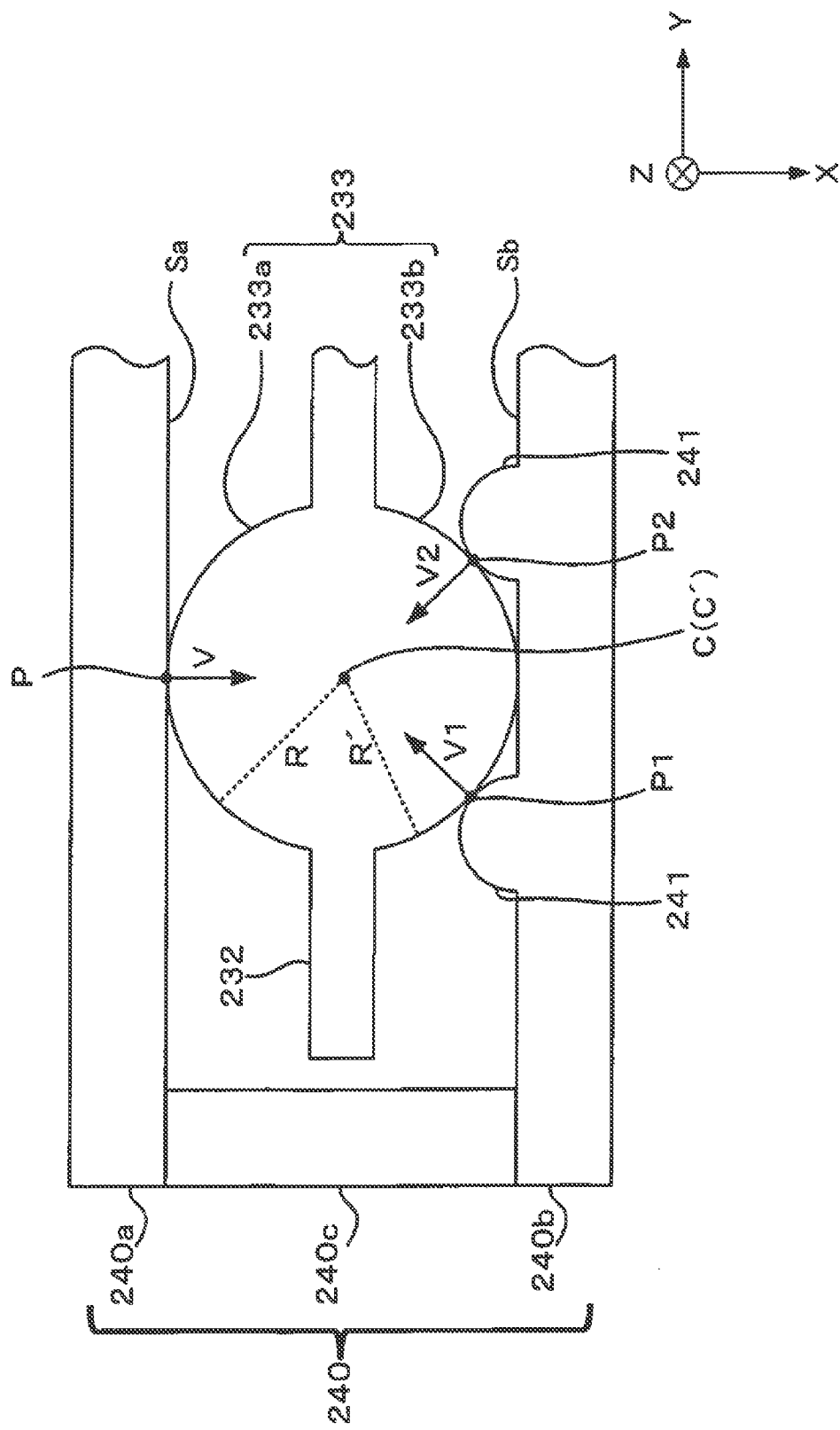
FIG. 11 It is a diagram showing the holding member and the fθ lens held by the holding member according to a modified example 4.

As a specific example, as shown in FIG. 11, a configuration in which two convex parts 241 are provided on the holding surface Sb the second holding part 240b is described. When the second protruding part 233b comes into contact with these convex parts 241, vectors V1 and V2 of the forces at each contact point (P1 and P2) are always directed toward the circle center C (C'). Also, by making contact at the multiple points in this manner, movement of the circle center C' of the arc of the second protruding part 233b is restricted, and even if the fθ lens 230 becomes tilted relative to the holding member 240 due to the holding, the circle center C' does not move relative to the holding member 240. It is also sufficient to provide the convex parts 241 to both of the holding parts (the first holding part 240a and the second holding part 240b).

Modified Example 5

The optical element is not limited to the fθ lens 230 used for the image-forming device. For example, it is also possible to use another optical element (for example, a free-form surface mirror for reflecting and focusing lasers) used for electrophotographic image-forming systems, a reflective projection optical element used for head-up displays or rear-projection televisions, or the like. Alternatively, it is also possible to use microlenses, or the like, that are built into mobile information devices. In other words, as long as the optical element is one that may be affected by distortion, such as materials with low susceptibility to thinning and stiffness or lengthy elements, the element can be applied to the configuration of the present invention.

<Working Example>

As a detailed working example of the present invention, the fθ lens 230 having the configuration shown in FIGS. 3 through 7 was produced through integral molding using thermoplastic resin, and the distortion resulting from holding using the holding member 240 having the configuration shown in FIGS. 2, 6 and 7 was measured. Also, for comparative purposes, a fθ lens 230', as a comparative example, having the configuration shown in FIGS. 12 and 13 was produced through integral molding using thermoplastic resin, the distortion resulting from holding using a holding member 240' was measured, and both results were compared. Here, for the lens 230, a lens with a length (length in the Y-direction) of 250 mm, a width (length in the Z-direction) of 19 mm, and a thickness (length in the X-direction) of 4 mm, in which the radius of the spherical shape of the protruding part 233 was 3 mm and the surface roughness Ra was 0.6 μm, was used. For the holding member 240, a stainless member with the surface roughness Ra of 1.0 μm was used.

Figure 12:
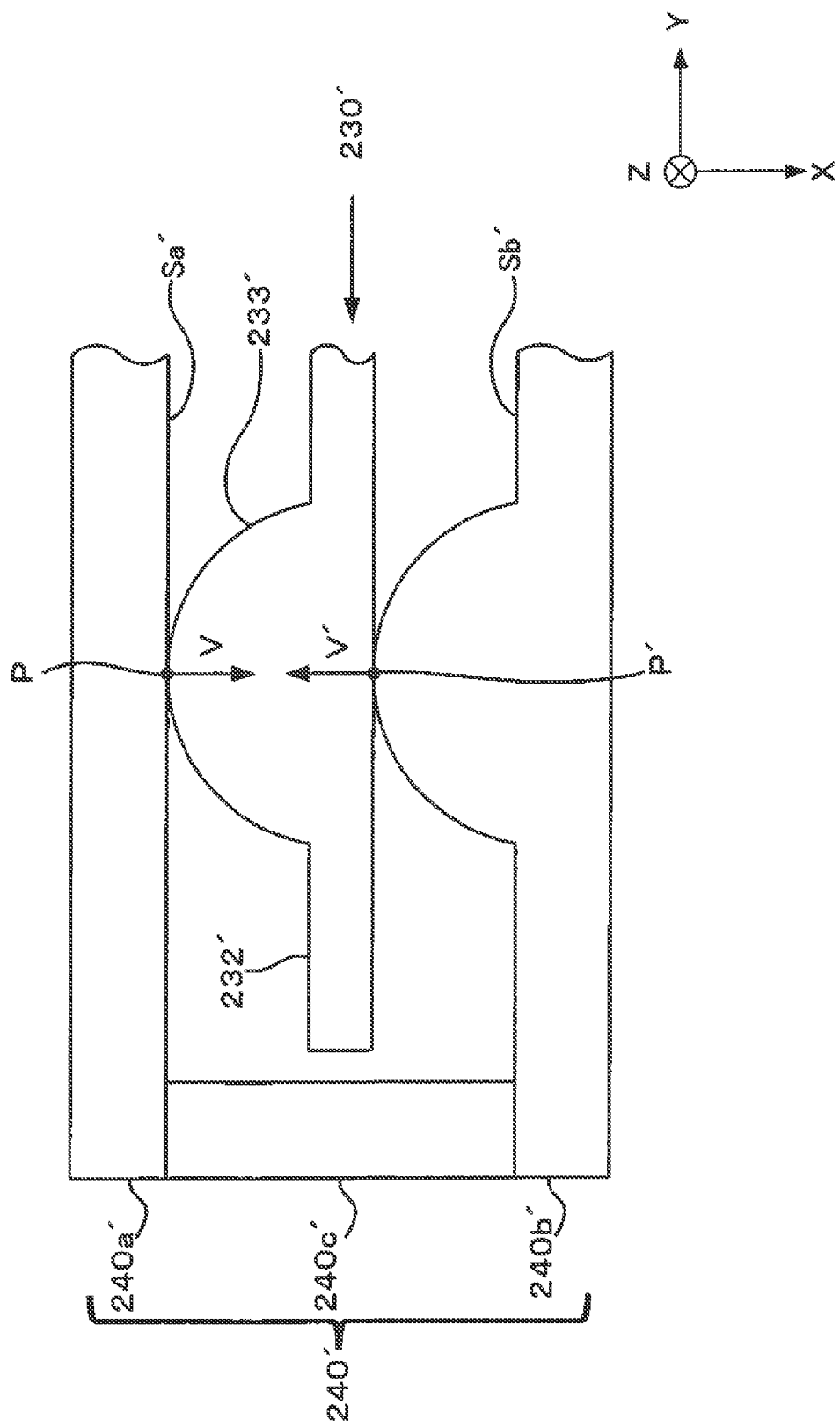
FIG. 12 It is a diagram showing the holding member and the fθ lens held by the holding member according to a comparative example.
Figure 13:
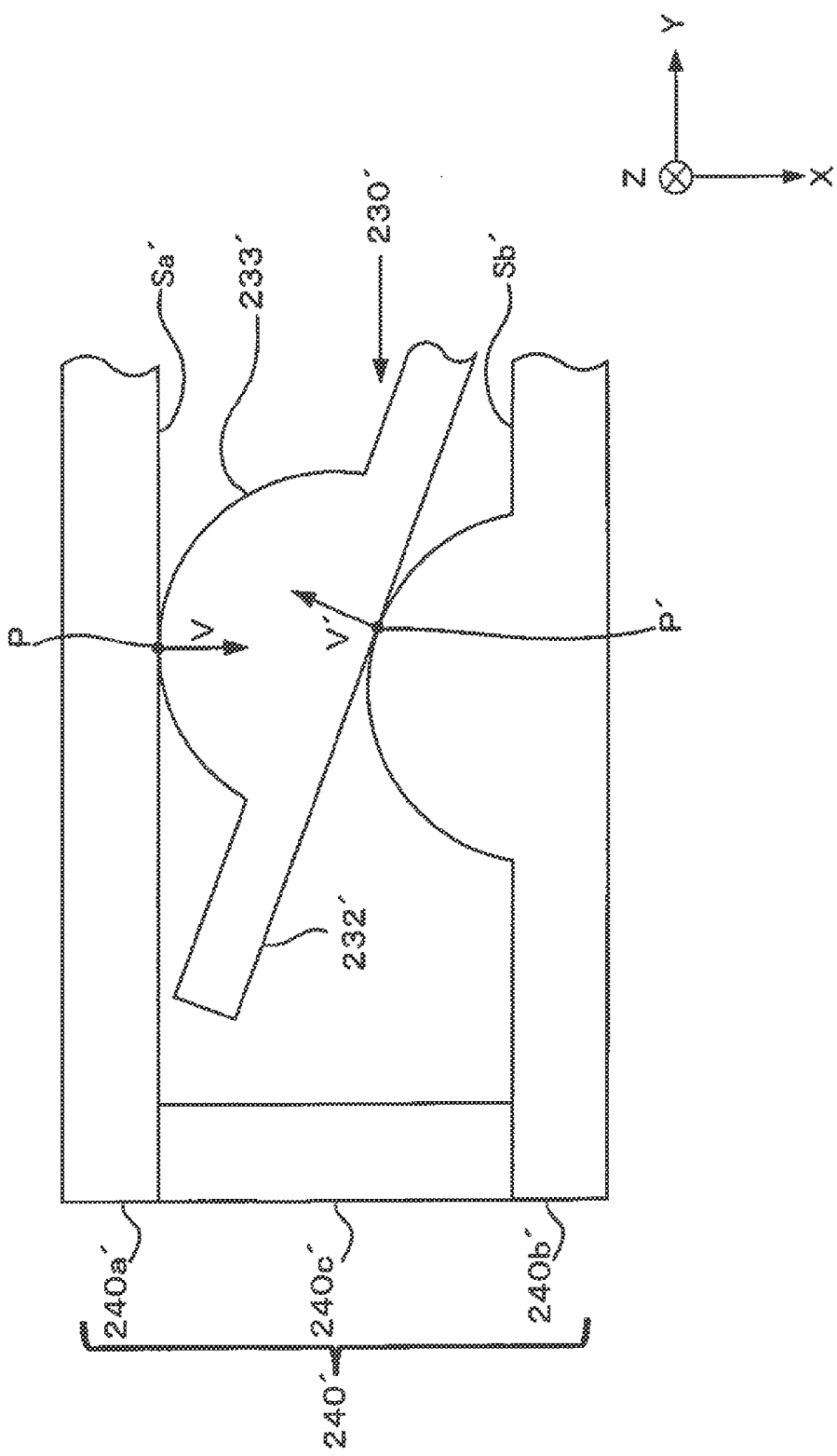
FIG. 13 It is a diagram showing a holding member and an fθ lens held by the holding member according to the comparative example.

As shown in FIGS. 12 and 13, the fθ lens 230' of the comparative example has the same shape as the lens shown in FIGS. 3 through 7, with the exception that a protruding part 233' is provided on only one surface of a peripheral part 232' (in other words, the protruding part 233' is provided in three locations). Further, the holding member 240' of the comparative example is configured including a first holding part 240a' (a holding surface Sa'), a second holding part 240b' (a holding surface Sb'), and a connecting part 240e. The holding surface Sb' of the second holding part 240b' is formed as a convex spherical shape, and comes into contact with the other surface of the peripheral part 232' of the re lens 230' at the point P'. On the other instances of the protruding part 233' that are not illustrated, convex spherical holding surfaces are provided at the respective positions of the corresponding holding member, and each is configured to come into contact with the back surface of the protruding part 233'. In the comparative example, the curvature and size of the protruding part 233' were completely identical with those of the protruding part 233, and the curvature and size of the convex part of the holding surface Sb' were also completely identical with those of the protruding part 233. Furthermore, shapes, sizes, thicknesses, or the like, of the fθ lens 230' other than the protruding part 233' were all identical with those of the fθ lens 230.

Distortion of the fθ lens 230 (the fθ lens 230') was measured using an Ultra Accuracy 3-D Profilometer ("UA3P") (manufactured by Panasonic Corporation).

Specifically, a measurement tool having the same configuration as the holding member 240 (the holding member 240') was prepared, the operation of attaching the same fθ lens 230 (the fθ lens 230') to the holding member of the same measurement tool was repeated five times, the shape in the attached state was measured for each attachment, and the misalignment from the design shape was calculated as the distortion amount.

It should be noted that the distortion amount for both the working example and the comparative example includes both the distortion resulting from the holding using the holding member 240 (the holding member 240') and geometric errors (so called "surface accuracy") in the fθ lens when actually produced with respect to the design values of the fθ lens.

As a result, in the configuration of the comparative example, each time attachment was performed, the degree of distortion of the fθ lens 230' varied greatly. It is believed that this is because the directions of the vectors of the forces applied at the contact point P (P') between the fθ lens 230' and the holding member 240' differed depending on the arrangement of the fθ lens 230'.

In other words, as shown in FIG. 12, when the fθ lens 230' is arranged to be parallel with the holding surface Sa' and the holding surface Sb', the vector V of the force applied to the protruding part 233' and the vector V' of the force applied to the surface of the peripheral part 232 are directed toward the same point. Consequently, it is difficult for misalignment to occur due to the moment, and therefore, there is little distortion effect of the fθ lens 230' due to holding.

On the other hand, when the fθ lens 230' is arranged with a tilt relative to the holding surface Sa' and the holding surface Sb', the vector V of the force applied to the protruding part 233' and the vector V' of the force applied to the surface of the peripheral part 232 are directed toward different points. Consequently, distortion occurs due to the effects of the rotational moment. Furthermore, according to the configuration described in Patent Document 1, it is more susceptible to the effects of rotational moment, and therefore, it is believed that greater distortion will occur in the fθ lens.

In comparison, the results for the configuration of the working example showed almost no variation in the degree of distortion of the fθ lens 230. Specifically, when maximum value of the variation observed in the comparative example is defined as 100%, the maximum value of variation in the degree of distortion between the five measurements was reduced to approximately 5%. As described above in relation to the embodiment, it is believed that this is because that since the vectors of the forces applied to the contact the point P (P') between the fθ lens 230 and the holding member 240 are directed toward the circle center C (C') regardless of the arrangement of the fθ lens 230, there is little distortion effect resulting from the holding using the holding member 240.

In this way, according to the configuration of the above embodiment, it is discovered that it is possible to drastically reduce the distortion effects occurring in the fθ lens 230 as a result of holding using the holding member 240.

EXPLANATION OF SYMBOLS

1 Image-forming device
20 Laser writing part
210 Light source part
210a Semiconductor laser diode
210b Collimate lens
210c Cylindrical lens
220 Rotating mirror
230 fθ lens
231 Lens part
232 Peripheral part
233 Protruding part
233a First protruding part
233b Second protruding part
240 Holding member
240a First holding part
240b Second holding part
240c Connecting part
250 Mirror
260 Frame body
C, C' Circle center
Sa, Sb Holding surface

The invention claimed is:

1. An optical element having a first surface, a second surface on the opposite side of the first surface, an optical surface provided on at least one of the first and second surfaces, and a protruding part, the protruding part being held in a prescribed position by being in contact with a holding member, wherein the protruding part comprises:
a first protruding part that is formed on the first surface and comprises a first contact part that is a convex circular arc shape on at least one longitudinal plane and partly comes into contact with the holding member, and
a second protruding part that is formed on the second surface and comprises a second contact part that is a convex circular arc shape on at least one longitudinal plane and partly comes into contact with the holding member, and
a circular arc that constitutes the first contact part and a circular arc that constitutes the second contact part are present in at least one cross-section that passes through a contact point between the first contact part and the holding member as well as a contact point between the second contact part and the holding member, and the center of the circular arc that constitutes the first contact part is aligned with the center of the circular arc that constitutes the second protruding part.

2. The optical element according to claim 1, wherein the first protruding part and/or the second protruding part have/has a spherical shape.

3. The optical element according to claim 1, wherein the first protruding part and/or the second protruding part have/has a cylindrical shape.

4. The optical element according to claim 1, wherein the radius of the circular arc that constitutes the first contact part is equivalent to the radius of the circular arc that constitutes the second contact part.

5. The optical element according to claim 1, wherein the radius of the circular arc that constitutes the first contact part is different from the radius of the circular arc that constitutes the second contact part.

6. The optical element according to claim 1, wherein an inclined surface is formed on at least one of the first protruding part and the second protruding part.

7. The optical element according to claim 6, wherein the optical element has dimensions that are long in a first direction and short in a second direction perpendicular to the first direction.

8. The optical element according to claim 1, wherein the optical element has dimensions that are long in a first direction and short in a second direction perpendicular to the first direction.

9. The optical element according to claim 8, wherein the protruding part is provided closer to an edge from a center of the optical element in the first direction.

10. The optical element according to claim 9 comprising a plurality of the protruding parts, wherein at least one protruding part is respectively provided closer to one end and the other end from the center of the optical element in the first direction.

11. The optical element according to claim 10 composed of plastic.

12. The optical element according to claim 9, wherein the first protruding part and the second protruding part are formed in an integrated manner on the first surface and the second surface, respectively.

13. The optical element according to claim 1, wherein the first protruding part and the second protruding part are formed in an integrated manner on the first surface and the second surface, respectively.

14. The optical element according to claim 1 comprising a plurality of the protruding parts.

15. The optical element according to claim 1 composed of plastic.

16. A holding structure for holding the optical element according to claim 1 at a prescribed position using the holding member, wherein
the holding member comprises:
a first holding part having a first flat surface that comes into contact with the first protruding part, and
a second holding part having a second flat surface that comes into contact with the second protruding part and is arranged parallel to the first flat surface.

17. The holding structure according to claim 16 comprising a biasing means for biasing at least one of the first and second holding parts toward the first or second protruding part.

18. An optical device comprising:
the holding structure according to claim 16.

19. A holding structure for holding the optical element according to claim 1 at a prescribed position using the holding member, wherein
the holding member comprises:
a first holding part that comes into contact with the first protruding part, and
a second holding part that comes into contact with the second protruding part, wherein
at least one of the first and second holding parts has a restricting member that restricts the movement of the centers of the circular arcs of the first and second contact parts of the optical element.

20. The holding structure according to claim 19, wherein one of the first and second holding parts has the restricting member that restricts the movement of the centers of the circular arcs of the first and second contact parts of the optical element, and the remaining part of either the first or second holding part is a flat surface.

* * * * *